United States Patent
Zhang

(10) Patent No.: US 8,989,059 B2
(45) Date of Patent: Mar. 24, 2015

(54) METHOD FOR TRIGGERING A STATUS REPORT OF AUTOMATIC REPEAT REQUEST

(75) Inventor: Jian Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 653 days.

(21) Appl. No.: 12/674,830

(22) PCT Filed: May 30, 2008

(86) PCT No.: PCT/CN2008/071149
§ 371 (c)(1),
(2), (4) Date: Feb. 23, 2010

(87) PCT Pub. No.: WO2009/039730
PCT Pub. Date: Apr. 2, 2009

(65) Prior Publication Data
US 2011/0085496 A1    Apr. 14, 2011

(30) Foreign Application Priority Data
Sep. 25, 2007    (CN) .......................... 2007 1 0154543

(51) Int. Cl.
H04B 7/005      (2006.01)
H04L 1/18       (2006.01)
H04L 12/403     (2006.01)

(52) U.S. Cl.
CPC ............ *H04L 1/1848* (2013.01); *H04L 1/1854* (2013.01); *H04L 1/1851* (2013.01)
USPC .......................................... 370/278; 370/449

(58) Field of Classification Search
None
See application file for complete search history.

(56) References Cited

U.S. PATENT DOCUMENTS

| 7,187,677 | B2  |   | 3/2007 | Torsner et al.       |
|-----------|-----|---|--------|---------------------|
| 7,496,085 | B2  | * | 2/2009 | Wu .............. 370/350 |
| 2003/0123403 | A1 |   | 7/2003 | Jiang               |
| 2003/0181214 | A1 | * | 9/2003 | Grob et al. ........ 455/515 |
| 2005/0073987 | A1 | * | 4/2005 | Wu .............. 370/349 |

(Continued)

FOREIGN PATENT DOCUMENTS

| CN | 1431784 A | 7/2003 |
|----|-----------|--------|
| CN | 1989721 A | 6/2007 |

(Continued)

OTHER PUBLICATIONS

3GPP TS 36.322 V8.0.0 (Dec. 2007), 3rd Generation Partnership Project; Technical Specification Group Radio Access Network; Evolved Universal Terrestrial Radio Access (E-UTRA) Radio Link Control (RLC) protocol specification.*

(Continued)

*Primary Examiner* — Eunsook Choi
(74) *Attorney, Agent, or Firm* — Oppedahl Patent Law Firm LLC

(57) ABSTRACT

The present invention discloses a method for triggering a status report of automatic repeat request. When a receiver acknowledged mode radio link control entity detects that received radio link control layer PDUs are missing, a timer T1 is set. When the timer T1 is running, new timer is not set even if a new missing radio link control layer PDU is detected. When the timer T1 is running, if the receiver acknowledged mode radio link control entity has received all missing radio link control layer PDUs which are detected before setting T1, the timer T1 is stopped. When the timer T1 times out, the receiver acknowledged mode radio link control entity triggers the status report.

20 Claims, 2 Drawing Sheets

(56) References Cited

U.S. PATENT DOCUMENTS

| | | | |
|---|---|---|---|
| 2005/0111371 A1 | 5/2005 | Miura et al. | |
| 2006/0013257 A1* | 1/2006 | Vayanos | 370/473 |
| 2006/0062223 A1 | 3/2006 | Manuel et al. | |
| 2006/0251105 A1* | 11/2006 | Kim et al. | 370/449 |
| 2008/0045219 A1* | 2/2008 | Terry | 455/436 |
| 2008/0298322 A1* | 12/2008 | Chun et al. | 370/335 |
| 2010/0118876 A1* | 5/2010 | Meyer et al. | 370/394 |
| 2010/0165919 A1* | 7/2010 | Chun et al. | 370/328 |

FOREIGN PATENT DOCUMENTS

| | | | |
|---|---|---|---|
| CN | 101127587 A | 2/2008 | |
| EP | 1326388 A2 | 7/2003 | |
| EP | 1326397 A2 | 7/2003 | |
| EP | 1868312 A1 | 12/2007 | |
| JP | 2000134263 A | 5/2000 | |
| JP | 2006506915 A | 2/2006 | |
| JP | 2010541310 A | 12/2010 | |
| KR | 102007004443 A | 4/2007 | |
| WO | 02-091659 A2 | 11/2002 | |
| WO | 02091659 A2 | 11/2002 | |
| WO | 2007078142 A1 | 7/2007 | |
| WO | 2009039730 A1 | 4/2009 | |

OTHER PUBLICATIONS

Notification of the First Office Action of Korean application No. 1020107002739, issued on Mar. 22, 2011.
European Patent Office, Extended European Search Report of the European Patent Application 08757560.1, Jan. 19, 2012, 7 pages.
International Search Report in international application No. PCT/CN2008/071149, mailed Sep. 4, 2008.
English Translation of the Written Opinion of the International Search Authority in international application No. PCT/CN2008/071149, mailed on Sep. 4, 2008.
3GPP TSG-RAN WG2#58b R2-072569, Jun. 25-29, 2007.
Supplementary European Search Report in European application No. 08757560.1 , mailed on Jan. 19, 2012.
3GPP TS 36.322 V8.0.0; 3rd Generation Partnership Project; Technical Specification Group Radio Access Network; Evolved Universal Terrestrial Radio Access (E-UTRA) Radio Link Control (RLC) protocol specification (Release 8); Dec. 2007. (35 pages).

* cited by examiner

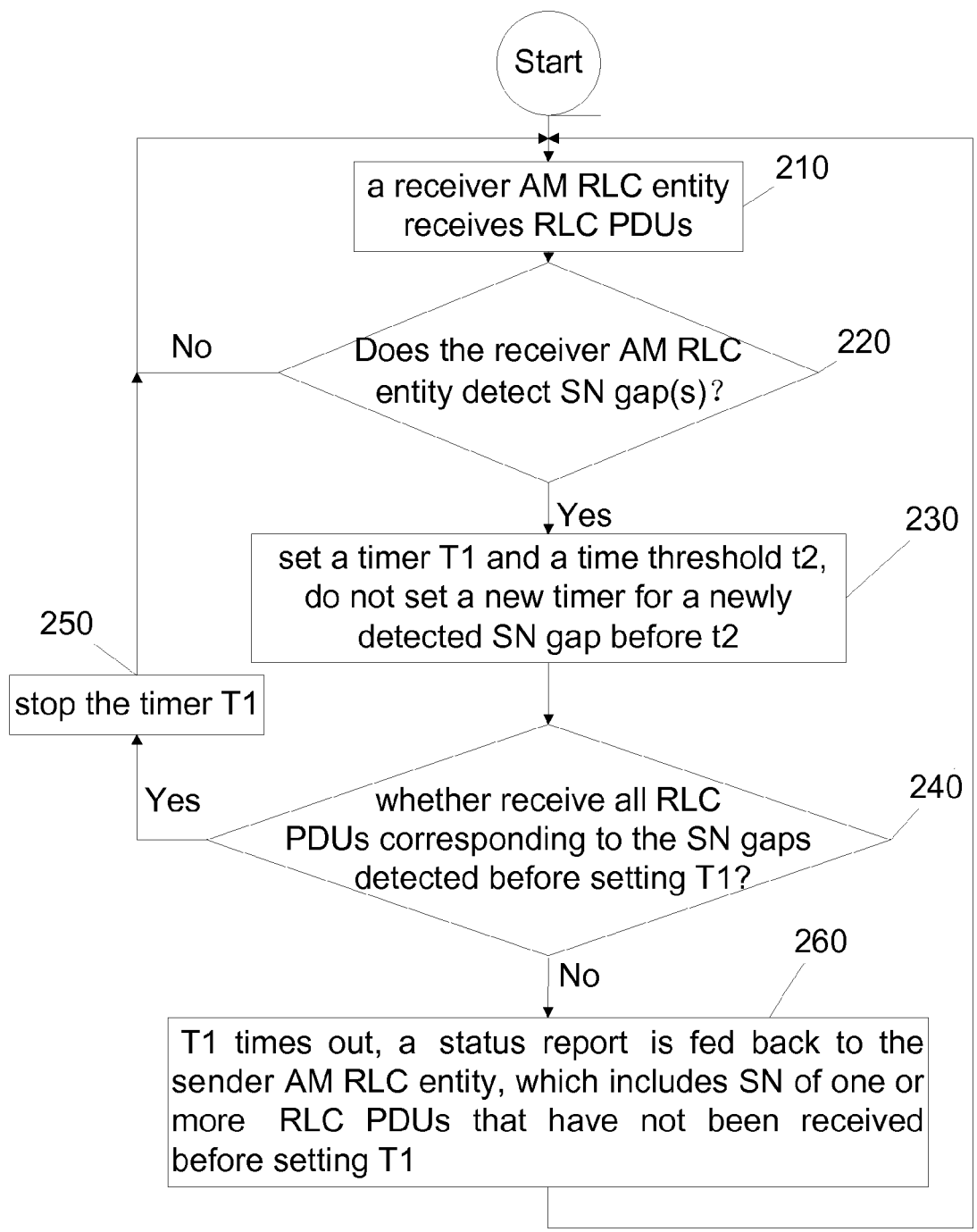

METHOD FOR TRIGGERING A STATUS REPORT OF AUTOMATIC REPEAT REQUEST

TECHNICAL FIELD

The present invention relates to the field of digital mobile communications technology, especially to a method for triggering a status report of Automatic Repeat request (ARQ) by an acknowledged mode radio link control (AM RLC) entity in a wireless communication system.

BACKGROUND

The mechanism of the receiver response status report of Automatic Repeat request (ARQ) by an Acknowledged Mode Radio Link Control (AM RLC) entity in a $3^{rd}$ generation mobile communication system includes three trigger patterns: periodic, Radio Link Control layer Protocol Data Unit (RLC PDU) missing detection, and receiving the Polling message of the sender. Acknowledgement (ACK) or negative is acknowledgement (NACK) messages are included in a status report, and there are three data packet formats: bitmap (BITMAP), list (LIST) and relative list (RLIST). Two mechanisms of forbidding polling and forbidding periodic polling are used to decrease the frequencies of the status report.

As to the trigger mechanism of the receiver response status report of Automatic Repeat request (ARQ) by an Acknowledged Mode Radio Link Control (AM RLC) entity in a $3^{rd}$ generation mobile communication long term evolution system, the conclusion of current 3GPP is that a state report should be triggered after a receiver's polling message is received, while other trigger mechanisms are still under discussion. Existing schemes under discussion comprise a receiver gap detection mechanism, i.e., when a receiver detects a gap among serial numbers (serial number, SN) of a received RLC PDU, i.e., the SNs thereof are not continuous, a timer is set in terms of the RLC PDU corresponding to the SN at the gap, and a status report is triggered when the timer times out. For example, the receiver receives RLC PDUs with SNs as 1, 2, 5 and 6, which means that the RLC PDUs with SNs as 3 and 4 at the gaps have not arrived at the receiver yet, so timers are set in terms of the RLC PDUs with SNs as 3 and 4 respectively, if the RLC PDUs with SNs as 3 and 4 still have not been received when the timers time out, status reports will be fed back respectively, wherein status reports include the negative acknowledgement (NACK) information of the above-mentioned RLC PDUs with SNs as 3 and 4, i.e., the RLC PDUs whose feedback information is NACK are those missing RLC PDUs with serial numbers 3 and 4 in the status report.

The main objective of adopting timers is to avoid false NACK status reports, due to the possible delay caused by Hybrid Automatic Repeat request (HARQ) retransmission, or after an HARQ entity of a sender has failed in retransmission for the maximum allowable number of times, the AM RLC entity of the sender will be notified directly to retransmit a RLC PDU, and an AM RLC entity of a receiver may receive the RLC PDU retransmitted by the sender immediately after detecting a gap. Under such situation, the receiver AM RLC entity should not feed back a NACK status report immediately after detecting a gap, but set a timer to wait for a certain period of time, and not feed back the status report until confirming that the RLC PDU corresponding to the SN at the gap has not been received when the timer times out.

Disadvantage of this scheme is that a timer has to be set respectively for every RLC PDU corresponding to the SN at the gap, and the status reports are fed back respectively when the timers time out, so the multiple messages will occupy much radio resources and lead to low efficiency. HARQ adopts multi-channel parallel processes and, with poor radio link status under normal circumstances, this may lead to unsuccessful retransmissions of multiple HARQ processes, thus a receiver AM RLC entity may detect several continuous or intermittent gaps during a short time period while receiving RLC PDUs. Under such condition, if an AM RLC entity has been notified to perform retransmission by an HARQ of the sender, the receiver AM RLC entity may receive RLC PDUs corresponding to the above-mentioned SNs at the gaps during a short time period, therefore, it will lead to resource waste to set a timer respectively for every RLC PDU corresponding to the SN at a gap.

SUMMARY

The technical problem which the present invention aims to solve is to make an improvement against the disadvantage of the existing scheme in which a timer needs to be set respectively for every RLC PDU corresponding to an SN at a gap, by providing a method for triggering a status report of Automatic Repeat request (ARQ) by an Acknowledged Mode Radio Link Control (AM RLC) entity.

To solve the above-mentioned technical problem, the present invention provides a method for triggering a status report of automatic repeat request, when a receiver acknowledged mode radio link control entity detects that received radio link control layer protocol data units are missing, a timer T1 is set, and when the timer T1 is running, no new timer T1 is set even if a new missing radio link control layer protocol data unit is detected.

Further, the above-mentioned method may also comprise the following characteristic: when the timer T1 times out, the receiver acknowledged mode radio link control entity may trigger a status report.

Further, the above-mentioned method may also comprise the following characteristic: the receiver acknowledged mode radio link control entity may determine whether any of the radio link control layer protocol data units is missing, by detecting whether there is a gap among serial numbers of the radio link control layer protocol data units; the missing radio link control layer protocol data units may include those detected before the timer T1 is set and those newly detected after the timer T1 is set.

Further, the above-mentioned method may also comprise the following characteristic: when the timer T1 is running, if the receiver acknowledged mode radio link control entity has received all missing radio link control layer protocol data units which are detected before the timer T1 is set, the timer T1 may be stopped.

Further, the above-mentioned method may also comprise the following characteristic: the status report may comprise serial numbers of those radio link control layer protocol data units that have not been received before the timer T1 times out and are missing before the timer T1 is set.

The present invention also provides another method for triggering a status report of automatic repeat request, when a receiver acknowledged mode radio link control entity detects that received radio link control layer protocol data units are missing, a timer T1 and a time threshold t2 are set, and when a new missing radio link control layer protocol data unit is detected before the time threshold t2, no new timer T1 is set.

Further, the above-mentioned method may also comprise the following characteristic: when the timer T1 times out, the receiver acknowledged mode radio link control entity may trigger a status report.

Further, the above-mentioned method may also comprise the following characteristic: the length of the time threshold t2 may be set to be no longer than timing length of the timer T1.

Further, the above-mentioned method may also comprise the following characteristic: the receiver acknowledged mode radio link control entity may determine whether any of the radio link control layer protocol data units is missing, by detecting whether there is a gap among serial numbers of the radio link control layer protocol data units; the missing radio link control layer protocol data units may include those detected before the timer T1 is set and those newly detected after the timer T1 is set.

Further, the above-mentioned method may also comprise the following characteristic: when the timer T1 is running, if the receiver acknowledged mode radio link control entity has received all missing radio link control layer protocol data units which are detected before the timer T1 is set, the timer T1 may be stopped; after the timer T1 is stopped, if a missing radio link control layer protocol data unit is detected again, a new timer T1 and a new time threshold t2 may be set.

Further, the above-mentioned method may also comprise the following characteristic: the status report may comprise serial numbers of those radio link control layer protocol data units that have not been received before the timer T1 times out and are missing before the timer T1 is set.

Further, the above-mentioned method may also comprise the following characteristic: when a new missing radio link control layer protocol data unit is detected after the time threshold t2, a new timer T1 and a new time threshold t2 may be set.

Methods of the present invention effectively decrease the number of timers used for triggering a status report of a receiver AM RLC entity ARQ, the number of messages used for feeding back the status reports and the number of message packets, and could thus improve the efficiency and the system performance of wireless resource.

BRIEF DESCRIPTION OF THE DRAWINGS

FIG. 2 is a flowchart illustrating a method for triggering a status report of ARQ by a receiver AM RLC entity in embodiment 2 of the present invention.

DETAILED DESCRIPTION

Figure 1:
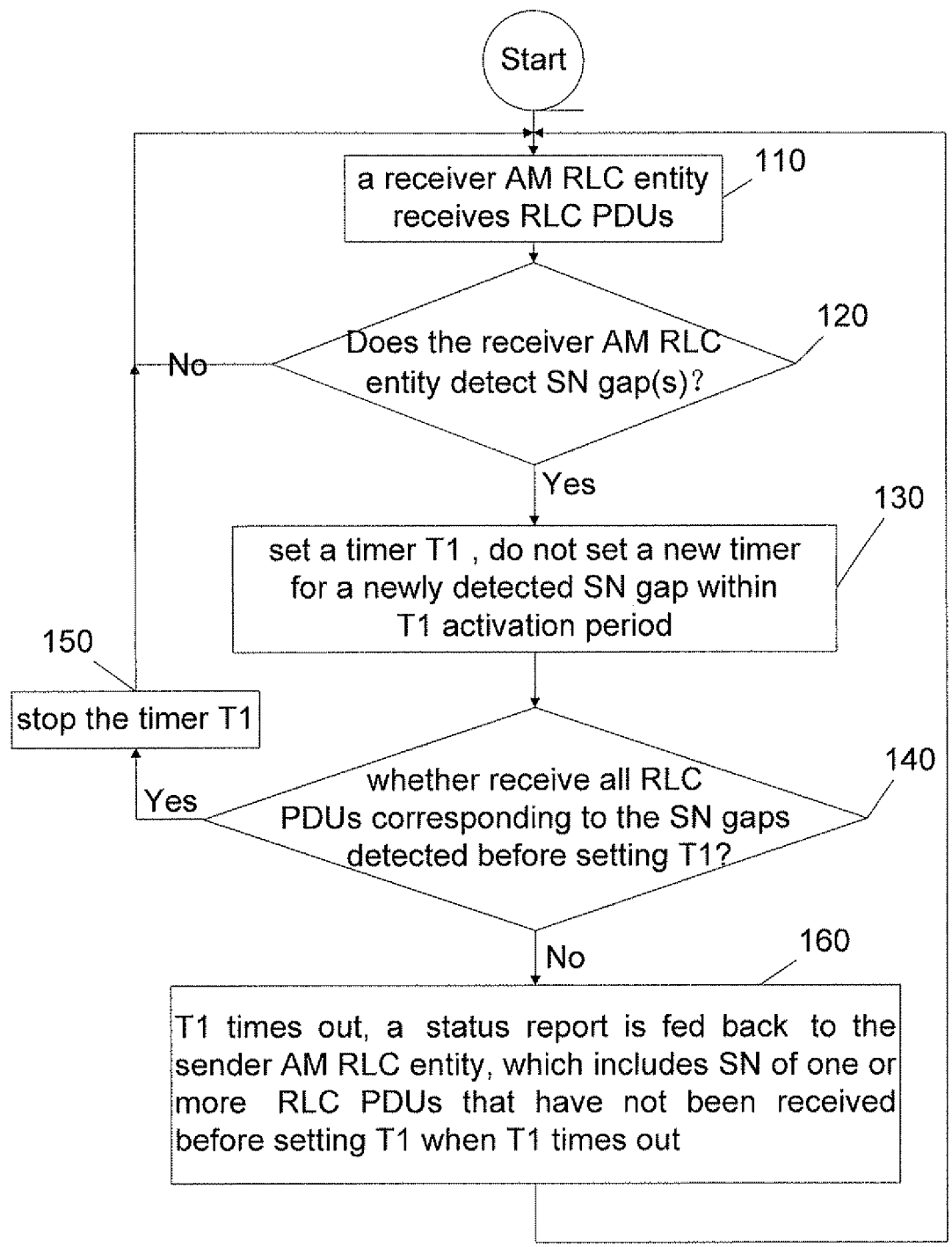
FIG. 1 is a flowchart illustrating a method for triggering a status report of ARQ by a receiver AM RLC entity in embodiment 1 of the present invention.

Key idea of the present invention is that: as to the status report trigger mechanism of gap detection or Detection of missing PDU(s) of a receiver AM RLC entity, if a timer is already activated, no extra timer should be activated, i.e., during a given period of time, only one timer is in activated state.

The main steps of the present invention comprise:

step 1: a receiver AM RLC entity receives RLC PDUs;

step 2: if the receiver AM RLC entity detects a gap among RLC PDU SNs, set a timer T1; when the timer T1 is running, if a new gap is detected among RLC PDU SNs, there is no need to set a new timer in terms of the new SN gap;

or, if the receiver AM RLC entity detects a gap among RLC PDU SNs, a timer T1 and a time threshold t2 are set; before the time threshold t2, if a new gap is detected among RLC PDU SNs, there is no need to set a timer T1 in terms of the new SN gap;

step 3: when the timer T1 is running, if the receiver AM RLC entity has received all RLC PDUs corresponding to SN gaps detected before the timer T1 is set, the timer T1 will be stopped; if a gap is detected again among RLC PDU SNs after the timer T1 is stopped, a new timer T1 will be set, or a new timer T1 and a new time threshold t2 will be set; and step 4: if the timer T1 times out, trigger a status report.

The status report fed back by the receiver AM RLC entity comprises SN gaps of one or more RLC PDUs that have not been received before the timer T1 times out and are missing before the timer T1 is set.

Illustration 1: in the step 2, the length of the time threshold t2 is set to be no longer than that of the timer T1.

Illustration 2: in the step 3, if the timer T1 is stopped, it will not time out. Before the timer T1 times out, if the receiver AM RLC entity has not received the RLC PDUs corresponding to one or more SN gaps which is detected before the timer T1 is set, the timer T1 will not be stopped, and thereby it will time out.

Illustration 3: under normal circumstances, SNs of the RLC PDUs that the receiver AM RLC entity receives are continuous, and SN gaps mean those missing SNs leading to discontinuity of SNs. For example, the receiver AM RLC entity will receive RLC PDU with SNs as 1, 2, 3, 4, 5 and 6 under normal circumstances, but actually receives RLC PDUs with SNs as 1, 2, 5 and 6, so 3 and 4 are SN gaps.

The present invention will be further illustrated in detail with reference to the drawings and embodiments hereinafter.

FIG. 1 is a flowchart illustrating a method for triggering a status report of ARQ by a receiver AM RLC entity in embodiment 1 of the present invention, including the following steps:

step 110, a receiver AM RLC entity receives RLC PDUs;

step 120: the receiver AM RLC entity determines whether SN gap(s) may be detected, if yes, turn to step 130, otherwise turn to the step 110;

step 130, set a timer T1, and do not set a new timer T1 for a newly detected SN gap when the timer T1 is running (i.e. within the activation period);

step 140, the receiver AM RLC entity determines whether it receives all RLC PDUs corresponding to the SN gaps detected before setting the timer T1 when the timer T1 is running, turn to step 150 if yes, and turn to step 160 if no;

step 150, stop the timer T1 and turn to the step 110; and step 160, the timer T1 times out, a status report is fed back to a sender AM RLC entity, which includes SN gaps of one or more RLC PDUs that have not been received before the timer T1 times out and are missing before setting the timer T1, turn to the step 110.

After the timer T1 is stopped or after feeding back the status report when the timer T1 times out, if there are still the newly RLC PDU SN gaps which are detected while the timer T1 is running, the timer T1 is set again, and the rest can be done in the same manner.

During the receiving process, the ARQ receiver maintains the receiving window and related receiving state variables, and updates them in real time according to practical reception status, if the state variable corresponding to the receiving window downside is less than the next serial number of the current received highest RLC PDU serial number, it means that RLC PDU SN gaps still exist.

FIG. 2 is a flowchart illustrating a method for triggering a status report of ARQ by a receiver AM RLC entity in embodiment 2 of the present invention, including the following steps:

step 210, a receiver AM RLC entity receives RLC PDUs;

step 220: the receiver AM RLC entity determines whether SN gap(s) may be detected, if yes, turn to step 230, otherwise turn to the step 210;

step 230, set a timer T1 and a time threshold t2, and do not set a new timer for a newly detected SN gap before the time threshold t2; and wherein, if a new SN gap is detected after the time threshold t2, even if the timer T1 has not timed out, a new timer would still be set.

Step 240, the receiver AM RLC entity determines whether it receives all RLC PDUs corresponding to the SN gaps detected before setting the timer T1 when the timer T1 is running, turn to step 250 if yes, and turn to step 260 if no;

step 250, stop the timer T1 and turn to the step 210; and step 260, the T1 times out, a status report is fed back to a sender AM RLC entity, which includes SN gaps of one or more RLC PDUs that have not been received before the timer T1 times out and are missing before setting the timer T1, turn to the step 210.

Industrial Applicability

The present invention is applied in a radio communication system for triggering a status report of Automatic Repeat request (ARQ) by an AM RLC entity, which decreases the number of timers used for triggering the status report of receiver AM RLC entity ARQ, the number of messages used for feeding back the status reports and the number of message packets, and also improve the efficiency and the system performance of wireless resource.

What is claimed is:

1. A method for triggering a status report of automatic repeat request, comprising the steps of that: when a receiver acknowledged mode radio link control entity detects that received radio link control layer protocol data units are missing, setting a timer T1 but not triggering any status report, and when the timer T1 is running, setting no new timer T1 even if a new missing radio link control layer protocol data unit is detected;

only when the timer T1 times out, triggering a status report by the receiver acknowledged mode radio link control entity, wherein the status report comprises serial numbers of the missing radio link control layer protocol data units;

when the timer T1 is running, if the receiver acknowledged mode radio link control entity has received all missing radio link control layer protocol data units which are detected before the timer T1 is set, stopping the timer T1.

2. The method according to claim 1, wherein, the receiver acknowledged mode radio link control entity determines whether any of the radio link control layer protocol data units is missing, by detecting whether there is a gap among serial numbers of the radio link control layer protocol data units; the missing radio link control layer protocol data units include those detected before the timer T1 is set and those newly detected after the timer T1 is set.

3. The method according to claim 2, wherein, the status report comprises serial numbers of those radio link control layer protocol data units that have not been received before the timer T1 times out and are missing before the timer T1 is set.

4. A method for triggering a status report of automatic repeat request, comprising the steps of that: when a receiver acknowledged mode radio link control entity detects that received radio link control layer protocol data units are missing, setting a timer T1 and a time threshold t2 but not triggering any status report, and when a new missing radio link control layer protocol data unit is detected before the time threshold t2, setting no new timer T1;

only when the timer T1 times out, triggering a status report by the receiver acknowledged mode radio link control entity, wherein the status report comprises serial numbers of the missing radio link control layer protocol data units;

when the timer T1 is running, if the receiver acknowledged mode radio link control entity has received all missing radio link control layer protocol data units which are detected before the timer T1 is set, stopping the timer T1; after the timer T1 is stopped, if a missing radio link control layer protocol data unit is detected again, setting a new timer T1 and a new time threshold t2.

5. The method according to claim 4, wherein, the length of the time threshold t2 is set to be no longer than timing length of the timer T1.

6. The method according to claim 4, wherein, the receiver acknowledged mode radio link control entity determines whether any of the radio link control layer protocol data units is missing, by detecting whether there is a gap among serial numbers of the radio link control layer protocol data units; the missing radio link control layer protocol data units include those detected before the timer T1 is set and those newly detected after the timer T1 is set.

7. The method according to claim 6, wherein, the status report comprises serial numbers of those radio link control layer protocol data units that have not been received before the timer T1 times out and are missing before the timer T1 is set.

8. The method according to claim 4, wherein, when a new missing radio link control layer protocol data unit is detected after the time threshold t2, a new timer T1 and a new time threshold t2 are set.

9. A method for triggering a status report of automatic repeat request, comprising the steps of that: when a receiver acknowledged mode radio link control entity detects that received radio link control layer protocol data units are missing, setting a timer T1 but not triggering any status report, and when the timer T1 is running, setting no new timer T1 even if a new missing radio link control layer protocol data unit is detected;

only when the timer T1 times out, triggering a status report by the receiver acknowledged mode radio link control entity, wherein the status report comprises serial numbers of the missing radio link control layer protocol data units.

10. The method according to claim 9, wherein, the receiver acknowledged mode radio link control entity determines whether any of the radio link control layer protocol data units is missing, by detecting whether there is a gap among serial numbers of the radio link control layer protocol data units; the missing radio link control layer protocol data units include those detected before the timer T1 is set and those newly detected after the timer T1 is set.

11. The method according to claim 9, wherein, when the timer T1 is running, if the receiver acknowledged mode radio link control entity has received all missing radio link control layer protocol data units which are detected before the timer T1 is set, stopping the timer T1.

12. The method according to claim 10, wherein, the status report comprises serial numbers of those radio link control layer protocol data units that have not been received before the timer T1 times out and are missing before the timer T1 is set.

13. The method according to claim 9, wherein, when the timer T1 is running, if the receiver acknowledged mode radio link control entity has received all missing radio link control layer protocol data units which are detected before the timer T1 is set, stopping the timer T1.

14. A method for triggering a status report of automatic repeat request, comprising the steps of that: when a receiver acknowledged mode radio link control entity detects that received radio link control layer protocol data units are missing, setting a timer T1 and a time threshold t2 but not triggering any status report, and when a new missing radio link control layer protocol data unit is detected before the time threshold t2, setting no new timer T1;

only when the timer T1 times out, triggering a status report by the receiver acknowledged mode radio link control entity, wherein the status report comprises serial numbers of the missing radio link control layer protocol data units.

15. The method according to claim 14, wherein, the length of the time threshold t2 is set to be no longer than timing length of the timer T1.

16. The method according to claim 14, wherein, the receiver acknowledged mode radio link control entity determines whether any of the radio link control layer protocol data units is missing, by detecting whether there is a gap among serial numbers of the radio link control layer protocol data units; the missing radio link control layer protocol data units include those detected before the timer T1 is set and those newly detected after the timer T1 is set.

17. The method according to claim 14, wherein, when the timer T1 is running, if the receiver acknowledged mode radio link control entity has received all missing radio link control layer protocol data units which are detected before the timer T1 is set, stopping the timer T1; after the timer T1 is stopped, if a missing radio link control layer protocol data unit is detected again, setting a new timer T1 and a new time threshold t2.

18. The method according to claim 16, wherein, the status report comprises serial numbers of those radio link control layer protocol data units that have not been received before the timer T1 times out and are missing before the timer T1 is set.

19. The method according to claim 14, wherein, when a new missing radio link control layer protocol data unit is detected after the time threshold t2, a new timer T1 and a new time threshold t2 are set.

20. The method according to claim 14, wherein, when the timer T1 is running, if the receiver acknowledged mode radio link control entity has received all missing radio link control layer protocol data units which are detected before the timer T1 is set, stopping the timer T1; after the timer T1 is stopped, if a missing radio link control layer protocol data unit is detected again, setting a new timer T1 and a new time threshold t2.

* * * * *